(No Model.)
J. B. COPELAND.
EVAPORATING PAN.
No. 470,548. Patented Mar. 8, 1892.
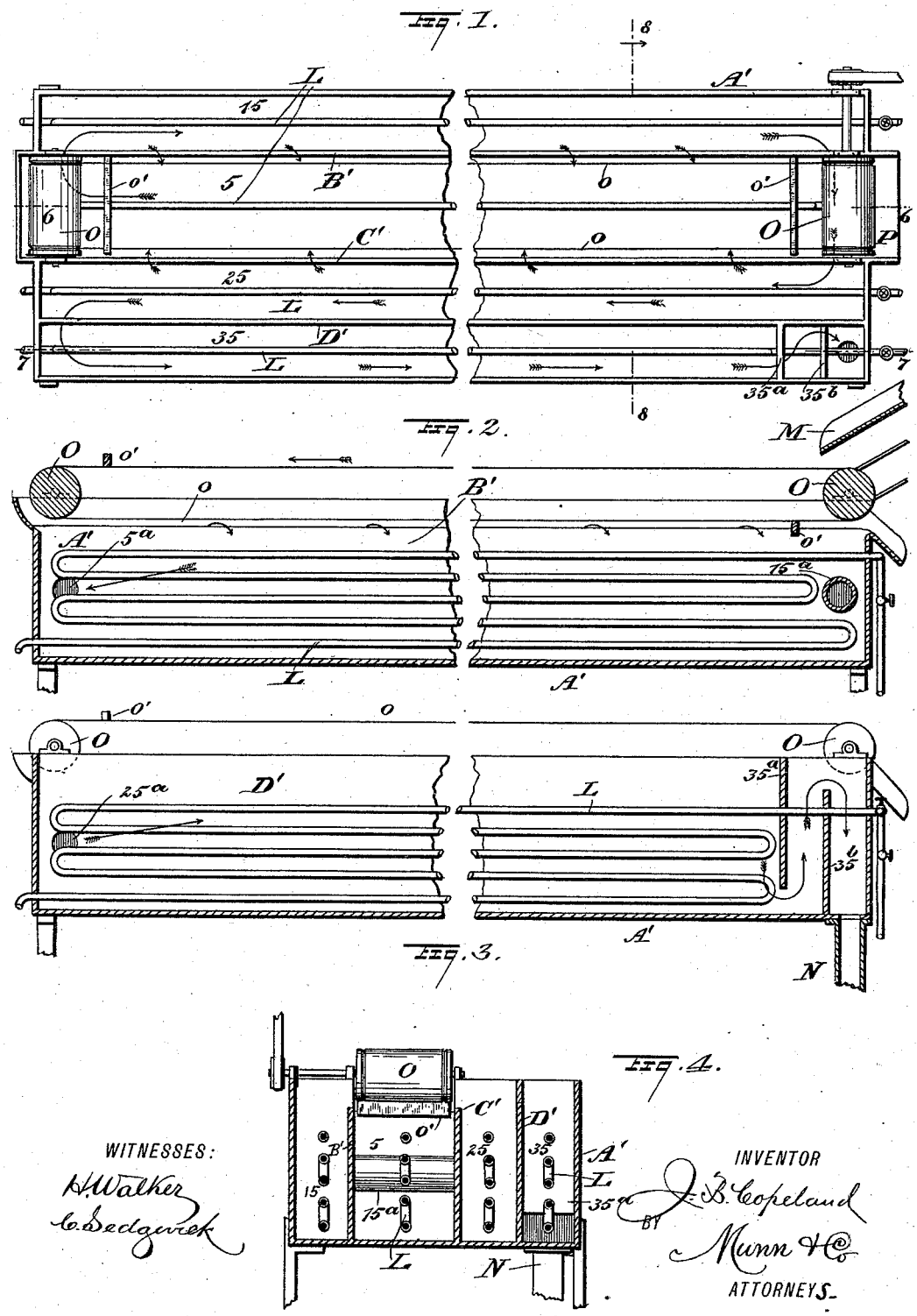

UNITED STATES PATENT OFFICE.

JAY B. COPELAND, OF PUNTA GORDA, HONDURAS.

EVAPORATING-PAN.

SPECIFICATION forming part of Letters Patent No. 470,548, dated March 8, 1892.

Application filed June 19, 1891. Serial No. 396,848. (No model.)

*To all whom it may concern:*

Be it known that I, JAY B. COPELAND, of Punta Gorda, Honduras, Central America, have invented a new and useful Improvement in Evaporating-Pans, of which the following is a full, clear, and exact description.

The present invention relates to apparatus for purifying saccharine juices in the manufacture of sugars and sirup, and has for its object the production of an apparatus of this class simple in construction and operation, and whereby the juices will be effectively heated, the scum and sediment thoroughly and expeditiously removed, and efficiency and economy generally promoted.

The invention consists in the novel construction and combination of parts, as hereinafter fully set forth, and defined in the claims.

Reference is to be had to the accompanying drawings, forming a part of this specification, in which similar letters and figures of reference indicate corresponding parts in all the views.

Figure 1 is a plan view of an apparatus embodying the invention. Fig. 2 is a longitudinal sectional elevation on line 6 6 of Fig. 1. Fig. 3 is a longitudinal sectional elevation on line 7 7 in Fig. 1; and Fig. 4 is a transverse sectional elevation on the line 8 8, Fig. 1.

In constructing an apparatus in accordance with my invention I provide a vessel A', rectangular in general contour, which is divided by longitudinal partitions B' C' D' into the compartments 5 15 25 35, all of which are provided with coils of steam heating-pipes L. The partitions B' C', which form the side walls of the compartment 5, are lower than the partition D' and lower than the walls of the vessel A', whereby the scum as the juice traverses successively the compartments 15 25 will boil over into the said compartment 5 to be removed by skimming devices hereinafter described.

A supply-chute M or equivalent means is arranged to deliver the juice to the compartment 5, which latter the juice traverses to the opposite end, where it escapes through an outlet-aperture $5^a$, formed in partition B' about midway in the height of the latter. The juice then traverses the compartment 15, and at the opposite end at which it entered it escapes through a transverse pipe $15^a$, which establishes communication between the compartments 15 and 25, the said pipe passing through the partitions B' C' about midway in the height thereof. The juice now traverses the compartment 25 and escapes to the compartment 35 through an aperture $25^a$ at the opposite end at which it entered, and after traversing the compartment 35 it passes under a baffle-plate $35^a$ and over a second baffle-plate $35^b$ to the final outlet-pipe N.

Above the inlet or first compartment 5 two rollers O O are arranged, one at each end, over which pass endless spaced strands o, which carry two or more plates or bars o', which serve to skim off the scum from the compartment 5 and direct it to a chute, trough, or other receptacle or conductor P.

The juice is partially heated in the compartment 5, highly heated in the next succeeding compartment 15, and so on, the temperature increasing until it finally escapes at the outlet. The scum is effectively and automatically removed and the annoying tendency to mix with the purified juice is effectively overcome. Further, the sediment is detained in the several compartments, provision being made in practice for removing it when accumulated.

With this apparatus I find the juice can be brought to as clear and pure a condition as is possible without the final treatment with bone-black, &c., the process is economical, and the resulting sugars are of a better average grade.

Having thus described my invention, I claim as new and desire to secure by Letters Patent—

1. In a purifier for saccharine juices, a vessel divided by partitions into a series of longitudinal compartments 5 15 25, ranging side by side, the first-named being between the others and having its side walls lower than the outer walls of the compartments 15 25 for the overflowing of the scum from both of the latter to the said compartment 5, a passage-way leading from the compartment 5 to the compartment 15, and a pipe or passage-way leading from the compartment 15 across the compartment 5 to the compartment 25 at the opposite side, the last-mentioned compartment having a suitable outlet, substantially as described.

2. In a purifier for saccharine juices, a vessel divided by partitions into a series of longitudinal compartments 5 15 25 35, ranging side by side, the first-named being between the compartments 15 25 and having means for supplying it with material to be treated and means for removing the scum and having its side walls lower than the outer walls of the adjacent compartments for the overflowing of the scum from both of the latter to said compartment 5, a passage-way leading from the compartment 5 to the compartment 15, a pipe or passage-way leading from the compartment 15 across the compartment 5 to the compartment 25 at the opposite side, a passage-way or opening leading from the compartment 25 to the compartment 35, and baffle-plates in the latter adjacent to its outlet, substantially as described.

JAY B. COPELAND.

Witnesses:
JAS. S. LESTER,
CHAS. A. COOPER.